US012759177B2

(12) United States Patent
Tancredi et al.

(10) Patent No.: US 12,759,177 B2
(45) Date of Patent: Oct. 13, 2026

(54) APPARATUS FOR TRANSVERSALLY CUTTING TUBULAR BODIES

(71) Applicant: GA.VO. MECCANICA S.R.L., Larciano (IT)

(72) Inventors: Antonio Tancredi, Lamporecchio (IT); Stefano Benvenuti, Lamporecchio (IT)

(73) Assignee: GA.VO. MECCANICA S.R.L., Larciano (IT)

( * ) Notice: Subject to any disclaimer, the term of this patent is extended or adjusted under 35 U.S.C. 154(b) by 88 days.

(21) Appl. No.: 18/847,180

(22) PCT Filed: Mar. 6, 2023

(86) PCT No.: PCT/IB2023/052063
§ 371 (c)(1),
(2) Date: Sep. 13, 2024

(87) PCT Pub. No.: WO2023/175438
PCT Pub. Date: Sep. 21, 2023

(65) Prior Publication Data

US 2025/0187219 A1 Jun. 12, 2025

(30) Foreign Application Priority Data

Mar. 14, 2022 (IT) ........................ 102022000004931

(51) Int. Cl.

| | |
|---|---|
| ***B26D 3/16*** | (2006.01) |
| ***B26D 7/01*** | (2006.01) |
| ***B26D 7/06*** | (2006.01) |

(52) U.S. Cl.
CPC ................. *B26D 3/16* (2013.01); *B26D 7/01* (2013.01); *B26D 7/0683* (2013.01); *B26D 2007/013* (2013.01); *B26D 7/0608* (2013.01)

(58) Field of Classification Search
CPC .......... B26D 3/16; B26D 7/01; B26D 7/0683; B26D 2007/013
See application file for complete search history.

(56) References Cited

U.S. PATENT DOCUMENTS 4,781,087 A * 11/1988 Shibata .................. D06H 7/025 83/18
4,794,684 A * 1/1989 Vanlauwe ............... B24B 19/02 451/69

(Continued)

FOREIGN PATENT DOCUMENTS

| | | |
|---|---|---|
| WO | 2008/114115 A2 | 9/2008 |
| WO | 2013/014601 A1 | 1/2013 |
| WO | 2013/017987 A1 | 2/2013 |

*Primary Examiner* — Omar Flores Sanchez
(74) *Attorney, Agent, or Firm* — Maschoff Brennan

(57) ABSTRACT

An apparatus for transversally cutting a tubular body of thickness (t) comprises a base frame on which two parallel cylinders are mounted horizontally and arranged to be rotatably actuated in a same rotation direction, thus forming a cradle arranged to support and to rotate the tubular body. A cutting head is arranged above the cradle, including a movable support that is arranged to be brought closer to or further away from the cradle, and that supports a rotatable circular blade arranged to cut the thickness (t) of the rotatable tubular body while being brought closer to the cradle. In order to stabilise the tubular body on the cradle, an idler accompanying or positioning roller is arranged between the cradle and the rotation axis of the blade.

14 Claims, 13 Drawing Sheets

(56) References Cited

U.S. PATENT DOCUMENTS

| | | | | | |
|---|---|---|---|---|---|
| 5,315,907 | A * | 5/1994 | Biagiotti | B26D 3/16 | |
| | | | | 83/318 | |
| 5,873,806 | A * | 2/1999 | Biagiotti | B26D 5/08 | |
| | | | | 83/318 | |
| 6,098,510 | A * | 8/2000 | Hada | B65H 35/02 | |
| | | | | 83/13 | |
| 7,841,263 | B1 * | 11/2010 | Brodbeck | B23D 21/14 | |
| | | | | 82/83 | |
| 2002/0078808 | A1 * | 6/2002 | Jacobsen | B23D 45/124 | |
| | | | | 83/210 | |
| 2021/0206014 | A1 * | 7/2021 | Turney | B26D 7/01 | |
| 2024/0391121 | A1 * | 11/2024 | Galoppini | B26D 3/16 | |

* cited by examiner 31
35
32
33
40
40'
1
1'
10
11
9
d
$D_2$
$D_s$
2
3
44
B
42
(B)

$t \leq d = D_2 - D_s$
t 10
7
7
8
2
7
11
7
22
21
6
65
20
6
66
7
68
7
6

17
2
10
25
24
22
23
20
67
21
6
7
6

APPARATUS FOR TRANSVERSALLY CUTTING TUBULAR BODIES

SCOPE OF THE INVENTION

The present invention relates to an apparatus for transversally cutting tubular bodies, such as tubular cores intended to support rolls of wound material.

BRIEF DESCRIPTION OF THE PRIOR ART

Various equipment is known for transversally cutting tubular bodies that are made of such materials as pressed cardboard or plastic, and are suitable to serve as support cores for rolls of flexible strip or sheet material. Such equipment usually includes rotary circular saw blades.

In order to improve the cutting precision, and to obtain smoother and cut edges, some equipment is configured to cause the tubular body to rotate about its longitudinal axis while being cut. Such an equipment is described, for instance, in WO 2008/114115 and WO 2013/017987.

This equipment comprises a base member on which a cradle formed by parallel idle cylinders is arranged on which the tubular body rests. A peripheral friction drive roller is provided to rotate the tubular body about its longitudinal axis. The tubular body is caused to advance along the cradle and positioned at the cut position manually or by a motorised pusher. The circular blade is housed within the base member of the equipment, and is caused to rise from the base member up to a height suitable for cutting the tubular body. In order to allow the circular blade to come into contact the tubular body, the cradle is discontinued at the cutting position. In other words, the cradle is manufactured in two parts, each consisting of a couple of parallel idle cylinders arranged upstream and downstream of the cutting position, in the forward conveying direction of the tubular body.

The equipment described above has the drawback of requiring a precise mutual alignment of the rotational axes of several rotating parts, in particular, the axis of each idle cylinder of one portion of the cradle must be precisely aligned with the axis of the corresponding idle cylinder of the other part of the cradle, all of them having a common direction, and the rotation axes of the circular blade and of the peripheral drive roller must be arranged parallel to this direction as well.

Moreover, cut pieces as short as a few centimetres are difficult to obtain by the above-mentioned prior art equipment.

Moreover, that prior art equipment fails to provide a cut pressure distribution even enough to keep the tubular body firmly resting on the cradle, in its cutting position.

SUMMARY OF THE INVENTION

It is therefore an object of the present invention to provide an apparatus for transversally cutting a tubular body that allows an easy and quick alignment of the rotating parts thereof.

It is also an object of the invention to provide such an apparatus that allows easily cutting a tubular body into short pieces, in particular, into pieces as short as a few centimetres.

It is also an object of the invention to provide such an apparatus that makes it possible to apply to the tubular body being cut a more even cut pressure, in order to further improve cutting accuracy.

These and other purposes are achieved by an apparatus for transversally cutting a tubular body having a predetermined thickness as defined in claim 1. Advantageous embodiments and modifications of the apparatus are defined in the dependent claims.

The apparatus includes:

a base frame;

a couple of cylinders horizontally arranged parallel to each other at a predetermined distance, and configured to turn in a same direction about respective longitudinal axes integral to the base frame;

an actuation means for rotatably actuating the tubular body;

a cutting head including in turn:

- a movable support arranged to perform a displacement towards and away from the couple of cylinders;
- a circular saw blade rotatably mounted to the movable support about its own rotation axis, which is integral to the movable support, and arranged with an own cutting plane or profile transversal to the cylinders, so that, by causing the circular blade to rotate during the displacement of the movable support towards the cylinders, the circular saw blade transversally cuts the thickness of the tubular body arranged and rotatably moved on the cylinders;
- an accompanying or positioning roller rotatably mounted to an arm and arranged to maintain the tubular body in contact with the cylinders during a rotation of the tubular body on the cylinders, wherein:

the rotational actuation means of the tubular body comprises a motor arranged to cause the cylinders to rotate about respective longitudinal axes, the movable support is arranged to perform the displacement, along with the circular blade, on an opposite side of the support to the cylinders, the accompanying roller is rotatably idle and arranged on the same side as the cylinders with respect to the rotation axis of the circular blade, and the arm:

- is movably connected to the movable support through a force member selected between an elastic force member and a constant-force member, and
- is arranged to move from a first raised position to a lowered position with respect to the movable support, wherein, in the raised position, the force member is in a rest configuration, and the distance of the accompanying roller from the cylinders is shorter than the distance of the circular blade from the cylinders,
- wherein, instead, in the lowered position, the force member is in a working configuration, and the distance of the accompanying roller from the cylinders is longer than the distance of the circular blade from the cylinders by a predetermined amount d which is at least equal to the thickness, that is, the relationship applies:

$$t \leq d = D_2 - D_s.$$

The combination of a movable circular blade approaching/retracting to/from the tubular body to be cut, and an accompanying roller whose movement depends on an elastic force or a constant force acting on the arm supporting it allows the movement of the positioning roller and the movement of the blade, in the direction of the tubular body, to be actuated in a coordinated manner so as to prepare the positioning roller before the blade is in the cutting position. To this purpose, the force member is configured to apply a force between the arm and the movable support that is lower, for example by at least one order of magnitude, than the force that an actuating unit applies on the movable support to cause it to move towards the tubular body to be transversally cut.

The arrangement of the circular blade in the movable cutting head configured to move towards/away from the cylinders and, therefore, towards/away the tubular body to be transversally cut, makes it possible to use a cradle comprising continuous cylinders. In other words, the cradle has a single pair of parallel cylinders extending from upstream to downstream of the cutting position, as in this case it is not necessary to break the cylinders to allow the blade to approach the tube from below, as is the case, instead, with the above-mentioned prior art equipment, in which the blade emerges from the base frame. This way, the required accurate alignment of the cylinders becomes easier and quicker, as it is sufficient to align the two cylinders of the cradle to each other and to the axis of the circular blade, which is less complicate than aligning the cylinders of two pairs of cylinders of the cradles upstream and downstream the cutting position to one another and to the axis of the circular blade.

The continuous construction of the cylinders of the cradle allows to more firmly support the tubular bodies at the cutting position, and therefore makes it easier to precisely cut pieces as short as a few centimetres.

Moreover, also the rotating blade and the accompanying roller(s) are easier to align to one another, as both are mounted to a same moving structure, i.e., the cutting head.

Moreover, the rotating blade mounted to the cutting head is easier to inspect than the rotating blades of the prior art, commonly mounted to the base frame, which simplifies and shortens maintenance operations and possible replacement of the blade and of the transmission components connected thereto, e.g., the motor belt, requiring periodic check, tensioning and sometimes replacement.

It should be noted that the term "force member" means a mechanical or hydraulic element of various designs suitable for generating a force or torque, depending on the embodiments described below, from when the accompanying roller comes into contact with the tubular body during the approaching displacement of the accompanying roller to the motorised cylinders. The term "force" is thus understood in a broad sense as "action", thus including a true force or a torque. As an alternative, tee action member could be referred to as a "reaction member".

In one embodiment, at least one linear guide member extends from the base frame, and on the same side as the cylinders with respect to the base frame, and the movable support comprises at least one housing that is slidably mounted along the linear guide member. Therefore, the movable is arranged to move along with the circular blade towards/away from the cylinders and the tubular body to be transversally cut. The linear guide member can be a cylindrical or parallelepiped column or pillar, and the housing of the movable support is provided with a through-hole of a shape and size corresponding to that of the linear guide member. Preferably, a pair of first longitudinal guides is provided, each slidably engaging with a respective housing of a pair of housings of the movable support.

In particular, the movable support can in turn comprise at least a second linear guide member, and the arm can comprise at least one housing slidably mounted along the second linear guide member, whereby the arm is in turn slidably arranged with respect to the movable support. In such a case, the force member is advantageously an elongated force member having a first end portion fixed to the movable support and a second end portion, in particular second end portion opposite the first end portion, fixed to the arm.

As an alternative, the arm is rotatably mounted to the movable support by means of a hinge. Also in this case, the force member can be an elongated force member having a first end portion fixed to the movable support and a second end portion, in particular opposite to the first end portion, fixed to the arm. As an alternative, the force member can be a torsion spring integrated in the hinge. The torsion spring can be a common elastic torsion spring or even a constant-torque spring.

In either case, the elastic elongated force member can be a compression spring. As an alternative, the elongated force member can be a pneumatic unit comprising a piston and a cylinder, i.e. a cylinder-piston assembly, providing respective end portions of the elongated force member, each selected between the first end portion and the second end portion, wherein a chamber is formed between the piston and the cylinder, said chamber containing an amount of a gas.

Preferably, the apparatus includes a force-adjusting means for adjusting the force applied between the arm and the movable support by the force member. Such a force-adjusting means is described further below, along with some exemplary embodiments of the invention.

In particular, the inner chamber of the cylinder-piston assembly can contain a predetermined and constant amount of gas, so as to form an elastic force member. As an alternative, the cylinder-piston assembly can include a discharge member of the inner chamber equipped with a precision valve in the form of an overflow valve or in the form of a suitably calibrated upstream-pressure reducing valve, configured to maintain a constant gas pressure in the inner chamber. In this case, the gas that is present within the inner chamber causes a constant force to be applied between the cylinder and piston, and the cylinder-piston assembly is therefore configured as a constant-force member.

In another embodiment, the movable support includes:

- a main support portion comprising the housing for engagement with the linear guide member, and
- an articulated support portion movably connected to the main support portion, to which the circular blade is rotatably mounted, and therefore the rotation axis of the circular blade is integral to the articulated support portion;
- an actuator configured to move the articulated support portion, along with the circular blade, with respect to the main support portion, whereby the absolute displacement of the circular blade is therefore obtained as the combination of:
  - the displacement of the movable support with respect to the base frame, and
  - the displacement of the articulated support portion with respect to to the main support.

The construction of the movable support in two mutually articulated parts makes it possible to add a displacement component of the circular blade to the displacement component of the movable support with respect to the base frame. This way, it is possible to speed up the last part of the approaching movement of the blade to the tubular body, which is particularly useful in an apparatus designed for automatically positioning the tubular bodies in the cutting position, in which a substantially continuous service of the equipment can be desired.

In particular, the articulated support portion can be slidably mounted to the main support portion, by means of an additional linear guide member. In such a case, according to one embodiment, the arm of the accompanying roller is preferably hinged to the main support portion of the movable support.

As an alternative, the articulated support portion can be rotatably mounted, i.e., hinged to the main support portion. In this case, according to another embodiment, the arm of the accompanying roller is preferably hinged to the articulated support portion of the movable support.

In a further embodiment, the movable support is hinged to an extension of the base frame, such that the movable support is rotatably arranged with respect to the base frame, and can thus perform displacements along with the circular blade towards and away from the cylinders and, therefore, towards and away from the tubular body to be transversally cut or cut transversally.

In one embodiment, the cutting head comprises two accompanying rollers and two respective arms of the type described above, wherein the accompanying rollers and the respective arms are mounted on opposite sides with respect to the circular blade, i.e. upstream and downstream thereof, according to a forward conveying direction of the tubular body towards the circular blade.

The two accompanying rollers, one upstream and the other downstream of the cutting position, cooperates with the continuous construction of the cradle cylinders to make easier to cut pieces as short as a few centimetres, in particular, if the accompanying rollers are arranged very close to the circular blade.

In particular, the two arms are movably connected to the movable support through two respective force members and a downstream force member movably connecting the movable support with a downstream arm of the accompanying roller arranged downstream of the circular blade, in said forward conveying direction, is configured to apply a force between the movable support and the downstream arm that is stronger than a force applied by an upstream force member movably connecting the movable support with an upstream arm of the accompanying roller that is arranged upstream of the circular blade, in the forward conveying direction.

Preferably, the accompanying roller, or each accompanying roller of the two accompanying rollers arranged on opposite sides with respect to the circular blade, comprises a plurality of equal wheels mounted to the same shaft or to a respective shaft, and arranged beside one another and spaced apart from one another by a predetermined pitch.

In an advantageous embodiment, the movable support comprises a first box-like portion, and a second box-like portion is integral to the arm, the second box-like portion having an opening through which a predetermined segment of the roller protrudes, and providing a slit configured to allow a predetermined segment of the circular blade to protrude when the arm is in the second position, the first box-like portion and the second box-like portion mutually arranged in such a way to form, during the displacement of the movable support, a box-shaped protection casing.

This way, the rotating blade is generally housed within the movable support of the cutting head, and partially protrudes from the box-shaped protection casing as long as the cutting step is in progress only, and is retraced within the casing once the cut has been performed. This is particularly safe in an apparatus in which the tubular bodies are brought manually at the cutting position, and the cut pieces are removed manually therefrom, in which case an operator can safely attain the cutting position with his/her own hands to position the tubular body and to remove the cut pieces.

In one embodiment, the apparatus further comprises a connection station for forming a butt connection between tubular elements. The connection station is preferably provided beside the cutting station along the cradle, so as to assist forming the butt connection between tubular cut pieces obtained by transversally cutting an initial tubular body in the in the cutting position, as descried above, without removing the cut pieces to be joined from the cradle.

The connection station may made as described, for instance, in WO 2008/114115 or WO 2013/014601.

BRIEF DESCRIPTION OF THE DRAWINGS

The invention will be now shown with the following description of exemplary embodiments thereof, exemplifying but not limitative, with reference to the attached drawings, in which.

DETAILED DESCRIPTION OF SOME EMBODIMENTS

Figure 1:
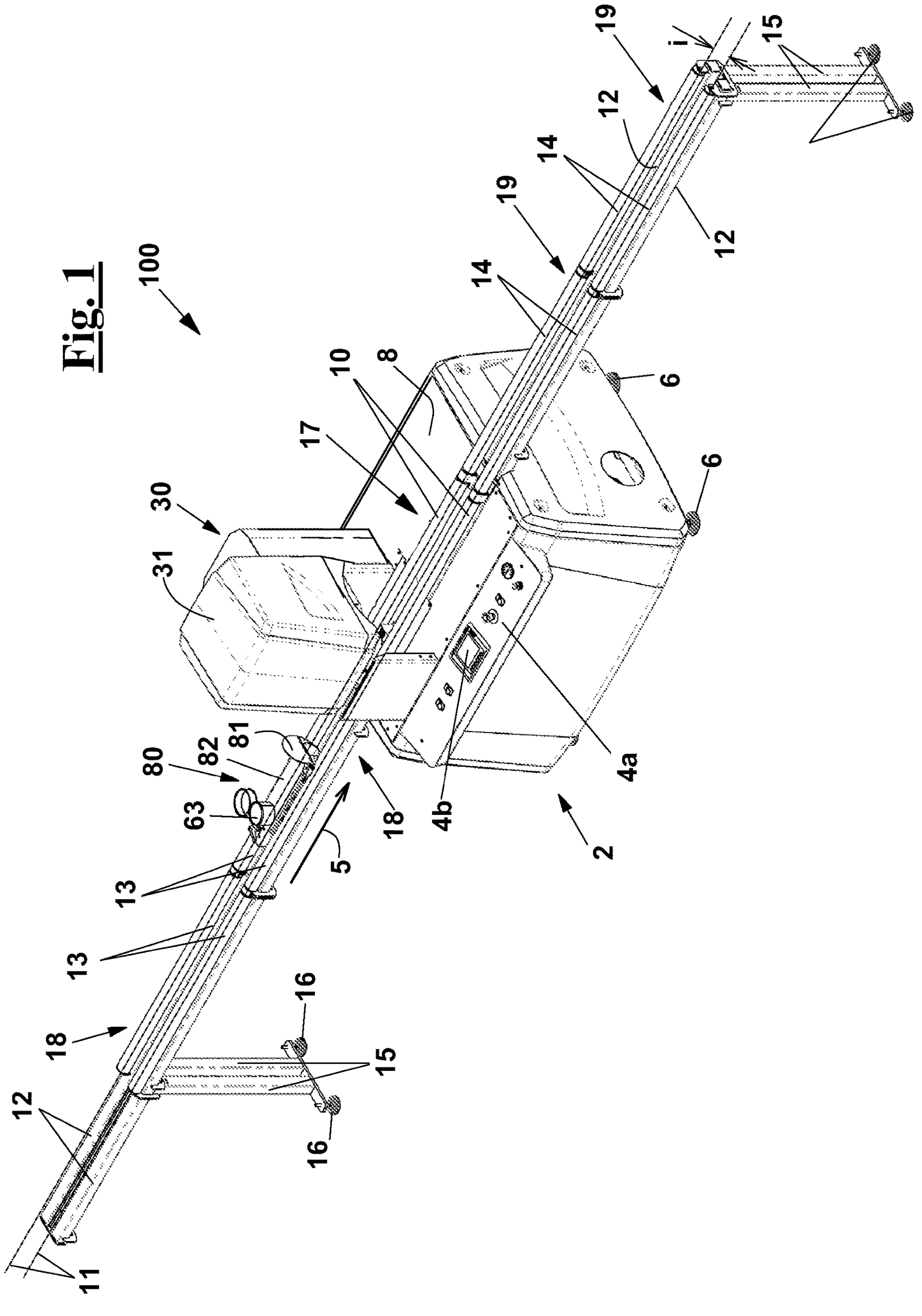
FIG. 1 is a diagrammatical perspective view of an apparatus for transversally cutting tubular bodies according to an embodiment of the invention.

With reference to FIG. 1, an apparatus 100 is described for transversally cutting a tubular body, in particular, a tubular body to be used as a tubular core to support rolls of wound material.

Apparatus 100 comprises a base frame 2 arranged to be positioned on a floor and possibly to be fixed to it preferably by a plurality of feet 6. Base frame 2 advantageously exposes a control console 4*a*, including control devices such as push buttons and/or a tactile display 4*b* as an interface for a user.

In order to transversally cutting the tubular bodies, apparatus 100 includes a cutting station 30 in which a cutting head 31 is arranged above an upper surface 8 of base frame 2.

A motorised cradle 17 is also provided on upper surface 8, including two motorised cylinders 10 rotatably arranged about respective longitudinal axes 11 parallel to each other at a distance i. Motorised cylinders 10 have a central portion below cutting head 31 of cutting station 30, and are arranged to cooperatively receive tubular bodies 1 to be cut, and to cause them to rotate about an own longitudinal axis 1', as diagrammatically shown in FIGS. 2A to 2I.

Figure 3:
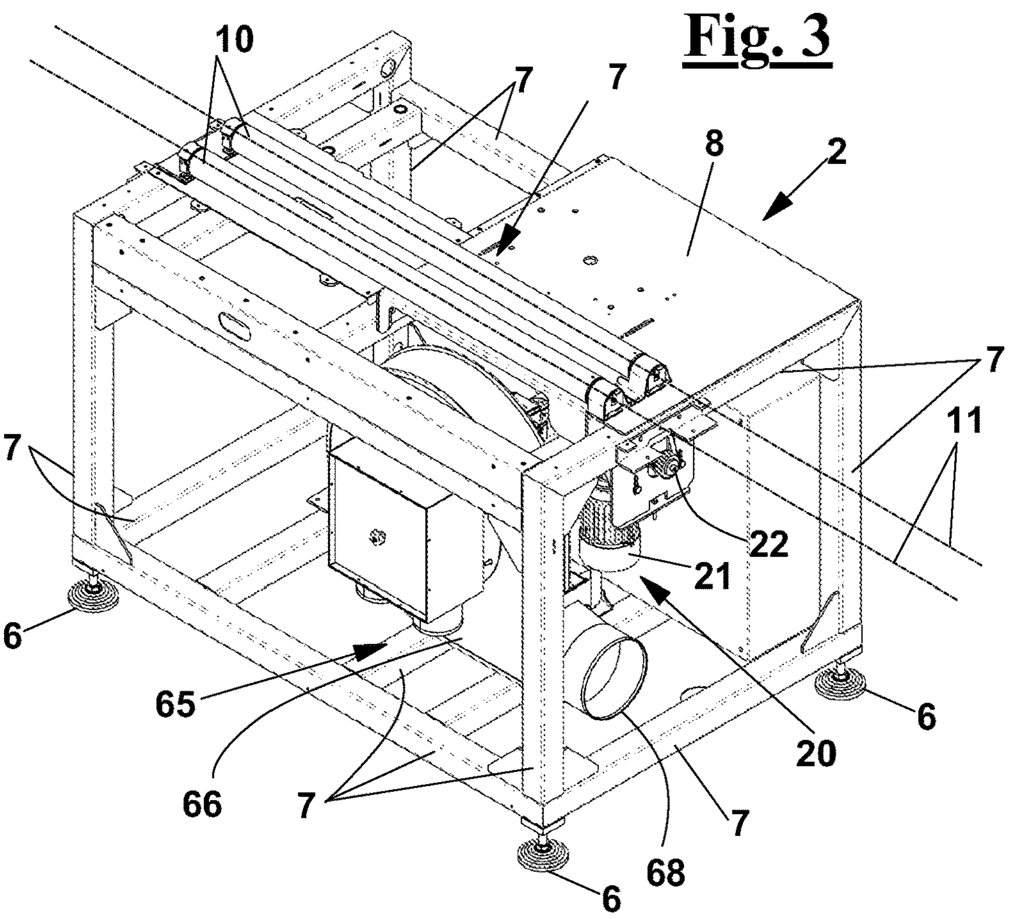
FIG. 3 is a diagrammatical perspective view of a base frame of an apparatus according to the invention, and of the components housed therein.
Figure 4:
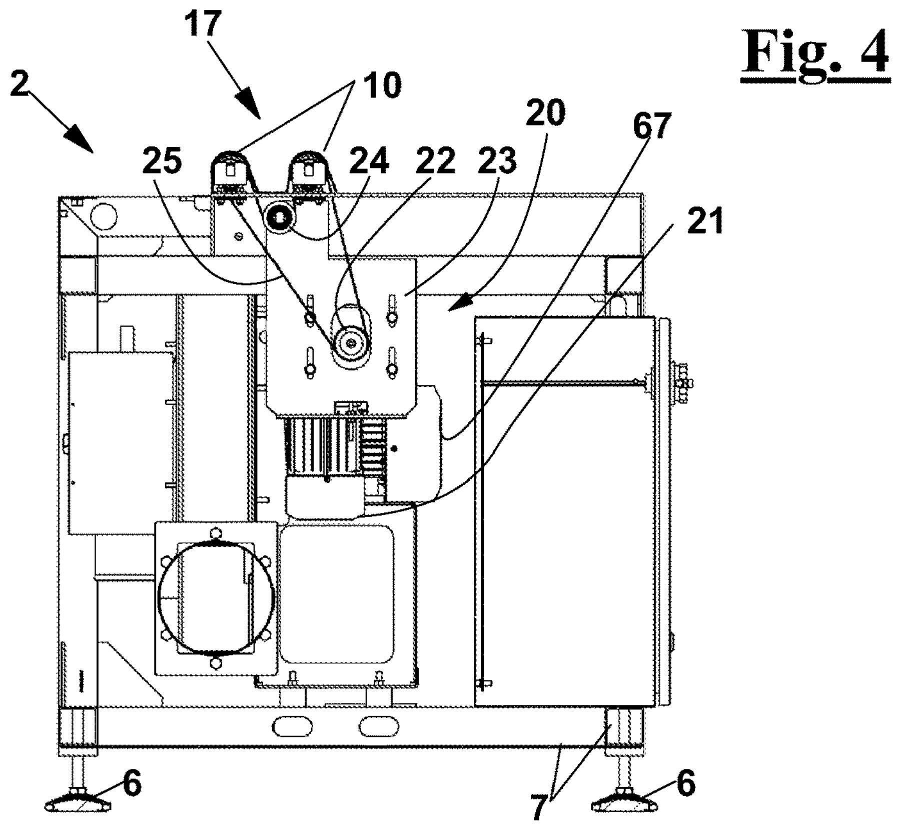
FIG. 4 is a diagrammatical side view of the base frame of FIG. 3, and of the components housed therein showing, in particular, the actuation means of the cylinders of the cradle.

More in detail, as shown in FIGS. 3 and 4, a rotational actuation means 20 is provided to cause cylinders 10 to turn about respective longitudinal axes 11. Rotational actuation means 20 can comprise, for instance, a motor 21 of a conventional type, typically an asynchronous motor 21. In a non-limiting embodiment, rotational actuation means 20 further comprises a speed reducer, not shown, and an output pulley 22 thereof. A belt drive is preferably provided including a belt 25 wrapped about output pulley 22, about pulley-shaped portions of cylinders 10, and about an intermediate idler pulley 24 arranged to cause cylinders 10 to turn in the same direction.

With reference to FIG. 1 again, apparatus 100 includes further cradles 18 and 19 aligned with motorised cradle 17 on both sides thereof to assist conveying tubular cores 1 towards and away from motorised cradle 17 and cutting station 30. In the depicted case, two further cradles 18 and 19 are provided upstream and downstream of motorised cradle 17, in a forward conveying direction 5 of tubular body 1. In the embodiment shown in FIG. 1, further cradles 18 and 19 include cylinders 13 and 14, respectively, aligned to one another and to motorised cylinders 10 of motorised cradle 17 along respective common longitudinal axes 11. In the same embodiment, cylinders 13 and 14 are non limitatively rotatably arranged and preferably freely rotatable about longitudinal axes 11. In order to support secondary cradles 18 and 19, support elements 12 are provided on opposite sides of base frame 2, in turn supported and fixed to the floor by respective legs 15 and feet 16.

As shown in FIGS. 2A-2I, cutting head 31 of cutting station 30 comprises a movable support 35 to which a circular blade 32 is mounted, rotatably arranged about an own rotation axis 33. A cutting profile of circular blade 32 is arranged transversally to cylinders 10, in particular orthogonally thereto.

Movable support 35 is arranged on an opposite side of base frame 2 with respect to cylinders 10, i.e., it is arranged above cylinders 10 so as to move towards/from cylinders 10 along with circular blade 32. In order to perform such movements, an actuation unit of conventional type is provided, not shown, in particular, a pneumatic actuation unit, which is also arranged within base frame 2.

An arm 42 extends from movable support 35 in the direction towards motorised cylinders 10 and base frame 2. In a position remote from movable support 35, at least one accompanying idle roller 40 is mounted to arm 42, rotatably arranged about a rotation axis 40' parallel to axes 11 of motorised cylinders 10. Accompanying roller 40 is arranged on the same side as cylinders 10 with respect to rotation axis 33 of circular blade 32, i.e., below rotation axis 33. Accompanying roller 40 serves to keep tubular body 1 in contact with cylinders 10 during rotation of tubular body 1 on cylinders 10.

Arm 42 is movably connected to movable support 35 through a force member 44.

Figure 2A:
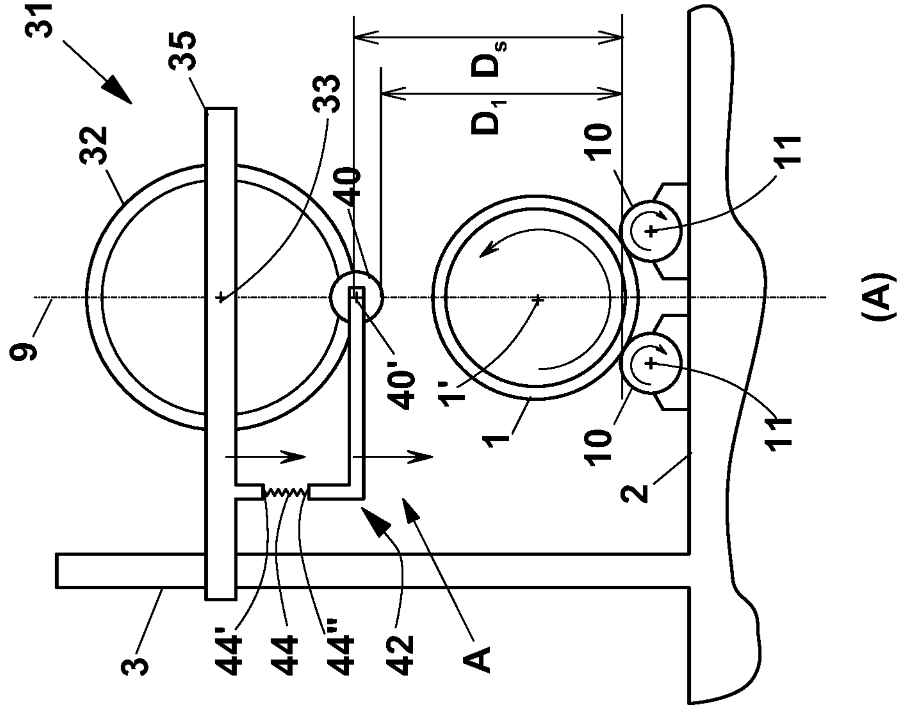
FIGS. 2A-2I diagrammatically show subsequent steps of a cutting operation in which a tubular body is transversally cut by an apparatus according to the invention.
Figure 2B:
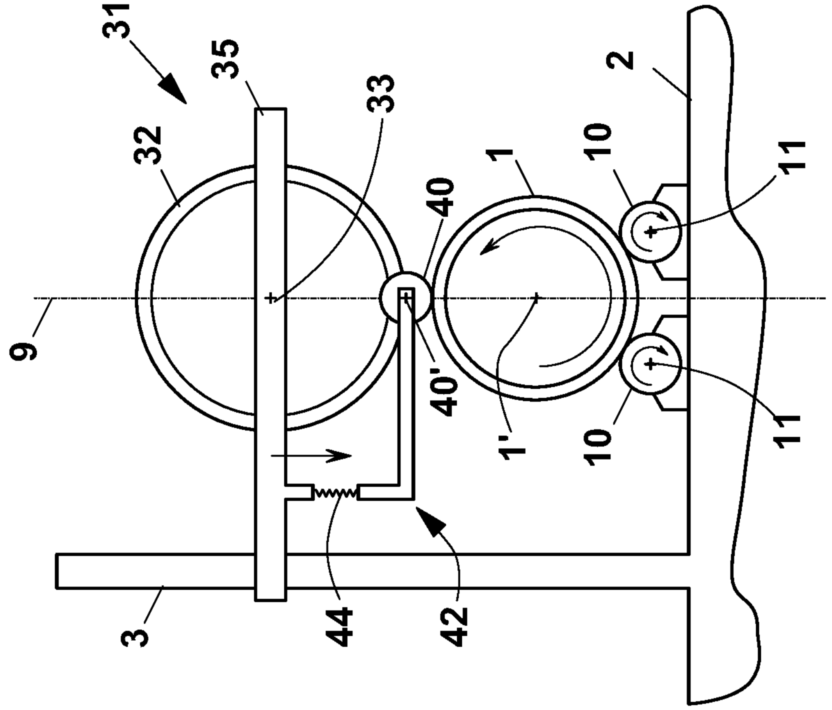
Figure 2C:
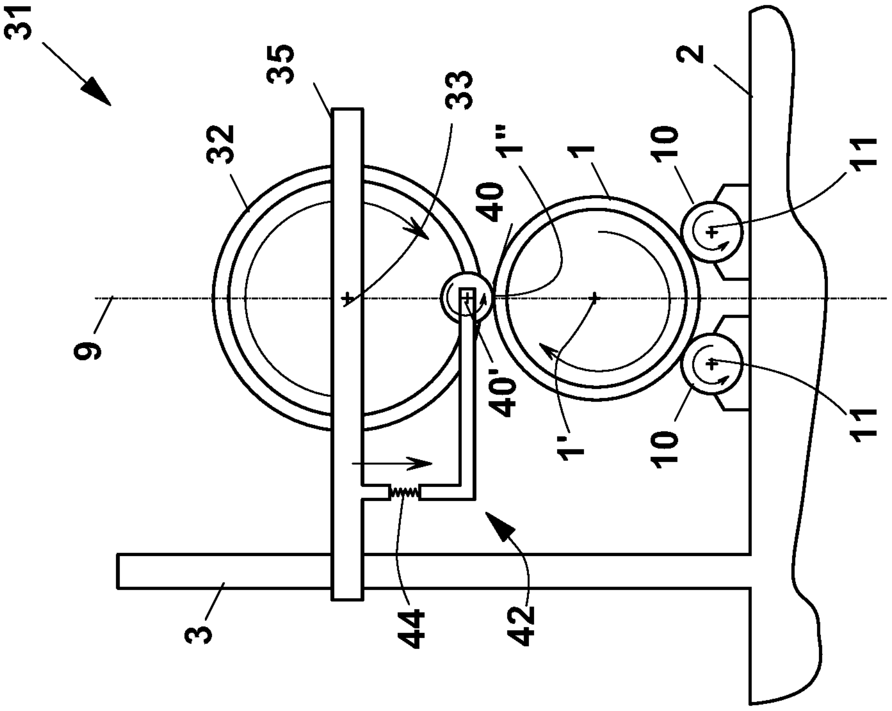
Figure 2D:
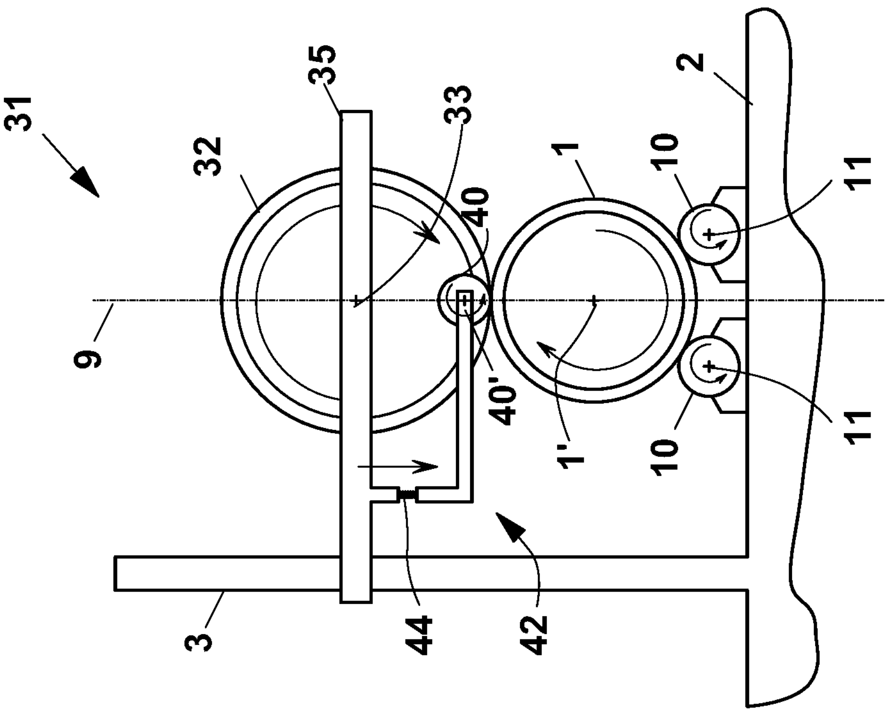
Figures 2E, 2F, 2G:
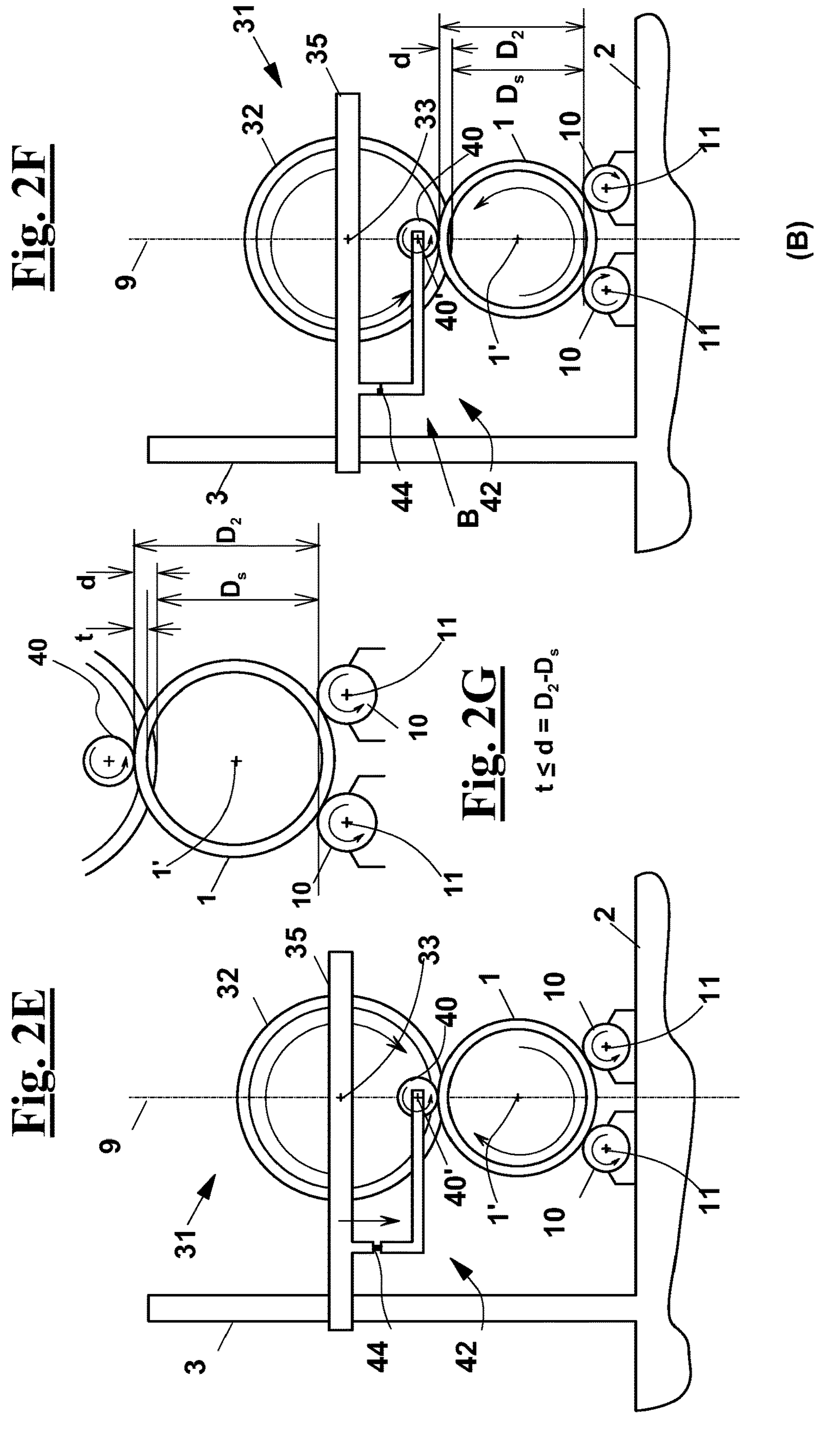

As shown in FIGS. 2A and 2F, arm 42 is arranged to move from a first raised position A to a lowered position B with respect to movable support 35. In raised position A (FIG. 2A), force member 44 is in a rest configuration, and the distance $D_1$ of accompanying roller 40 from cylinders 10 is shorter than the distance $D_S$ of circular blade 32 from cylinders 10. On the other hand, in lowered position B (FIG. 2F), force member 44 is in a working configuration, and the distance $D_2$ of accompanying roller 40 from cylinders 10 is longer than distance $D_S$ of circular blade 32 from cylinders 10 by a predetermined amount d which is at least equal to thickness t (FIG. 2G), i.e., the relationship applies:

$$t \le d = D_2 - D_s.$$

In other words, arm 42 is arranged to reversibly move from a first position A to a second position B, in which said force member 44 is in a resting configuration and in a working configuration, respectively, and in which the distance $D_1$,$D_2$ of accompanying roller 40 from the couple of cylinders 10 is:

shorter, and longer by a predetermined amount d, at least equal to thickness t, respectively, than the distance $D_S$ of circular blade 35 from the couple of cylinders 10.

Figure 2I:
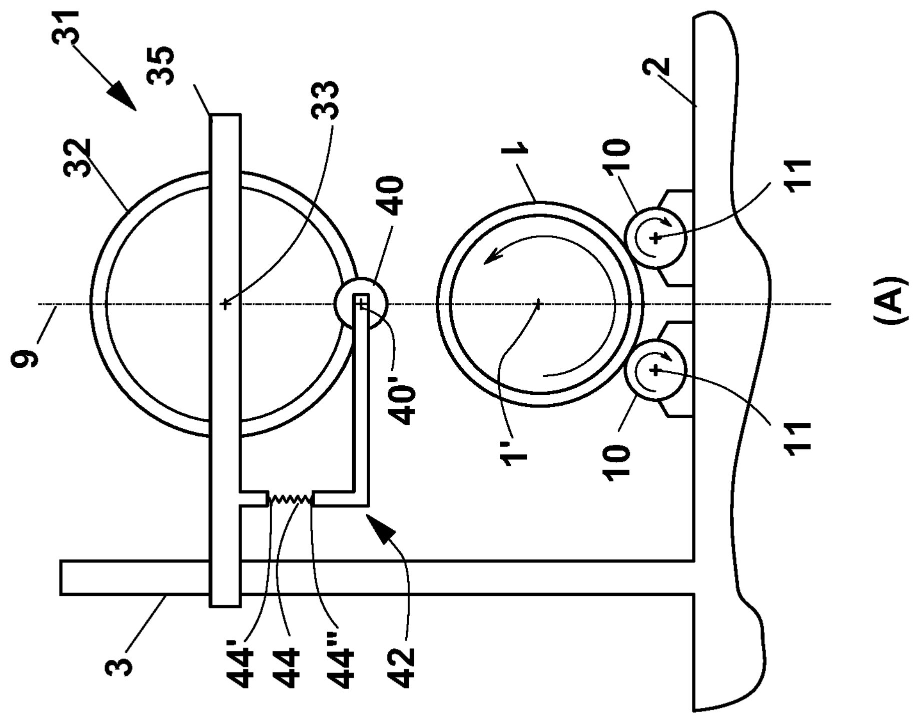
Figure 2H:
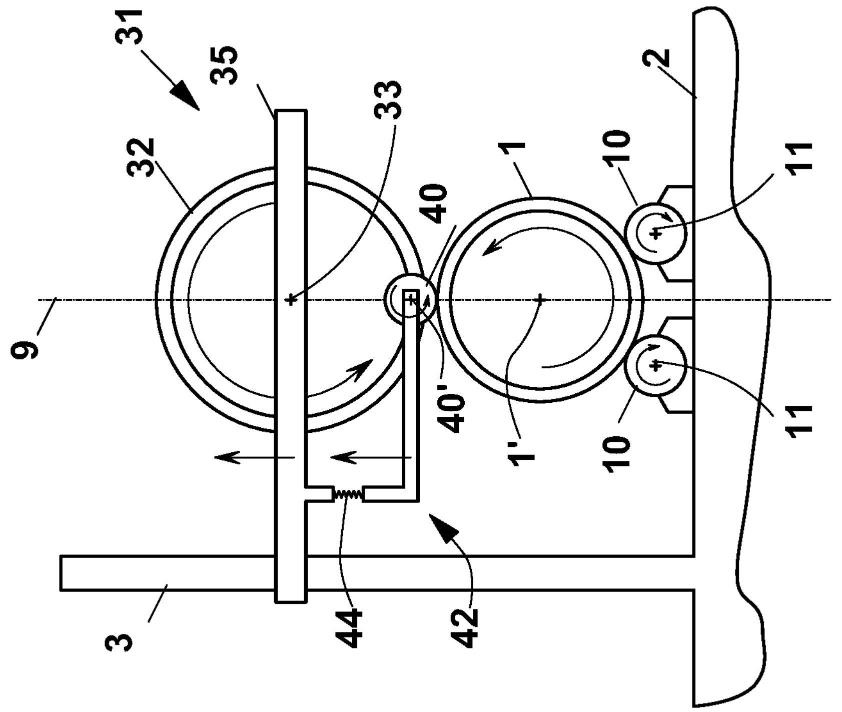

More in detail, FIGS. 2A-2I show a transversal cutting operation of a tubular body, in which the following steps are provided:

- a step of approaching accompanying roller 40 along with circular blade 32 to tubular body 1, from the raised position of arm 42 (FIG. 2A) to a position in which accompanying roller 40 has come into contact with tubular body 1 (FIG. 2B), during which step cylinders 10 and tubular body 1 can rotate about respective rotation axes;
- a step of approaching only circular blade 32 to tubular body 1 (FIG. 2C), until a position is attained in which circular blade 32 comes into contact with tubular body 1 (FIG. 2D), during which step accompanying roller 40 rotates due to friction with tubular body 1: this step is allowed by appropriately selecting a force $F_1$ with which movable support 35 is moved downwards, and a force $F_2$ that force member 44 is able to develop and oppose to force $F_1$ once accompanying roller 40 has come into contact with the upper outer generatrix 1" of tubular body 1, force $F_2$ being lower than force $F_1$, for example, by one or more orders of magnitude;
- a step of cutting rotating tubular body 1 (FIG. 2E), during which circular saw blade 32 progressively penetrates thickness t of tubular body 1 until lowered position B (FIG. 2F) is attained, at which the lowest point of the cutting profile of circular saw blade 32 is below the instantaneously lowest generatrix of accompanying roller 40 by an amount or length d at least equal to, preferably just higher than thickness t of tubular body 1 (FIG. 2G);

a first step of automatically lifting movable support 35, during which only circular blade 32 is raised until accompanying roller 40 detaches from tubular body 1 (FIG. 2H) and stops rotating;

a second step of automatically lifting movable support 35, during which circular blade 32 and accompanying roller are raised together until starting position A of FIG. 2A is restored (FIG. 2I).

As the arrows in FIGS. 2E and 2F show, during the cutting step, the rotation direction of motorised cylinders 10 and thus of tubular body 1 can be advantageously reversed, in order to improve cutting precision.

Therefore, as shown in FIGS. 2D-2F, by rotating circular blade 32 during the approach movement of movable support 35 to cylinders 10, circular blade 32 transversally cuts tubular body 1 resting on cylinders 10, limited to thickness t thereof.

Figure 5:
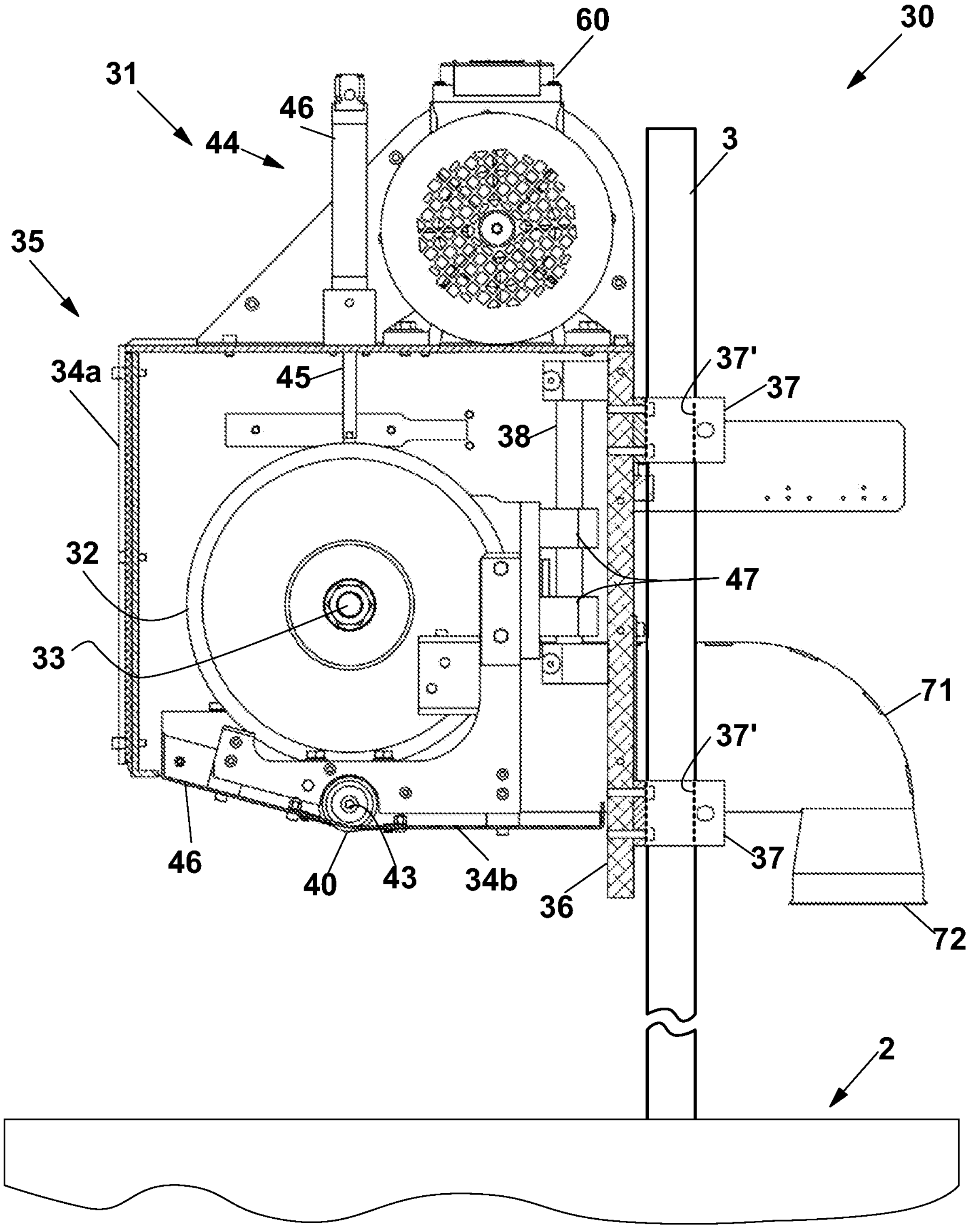
FIG. 5 is a diagrammatical cross-sectional view of a cutting head of an apparatus according to an embodiment of the invention, taken at a side cover element of a protection casing, in which the circular blade is slidably connected to the movable support.
Figure 7:
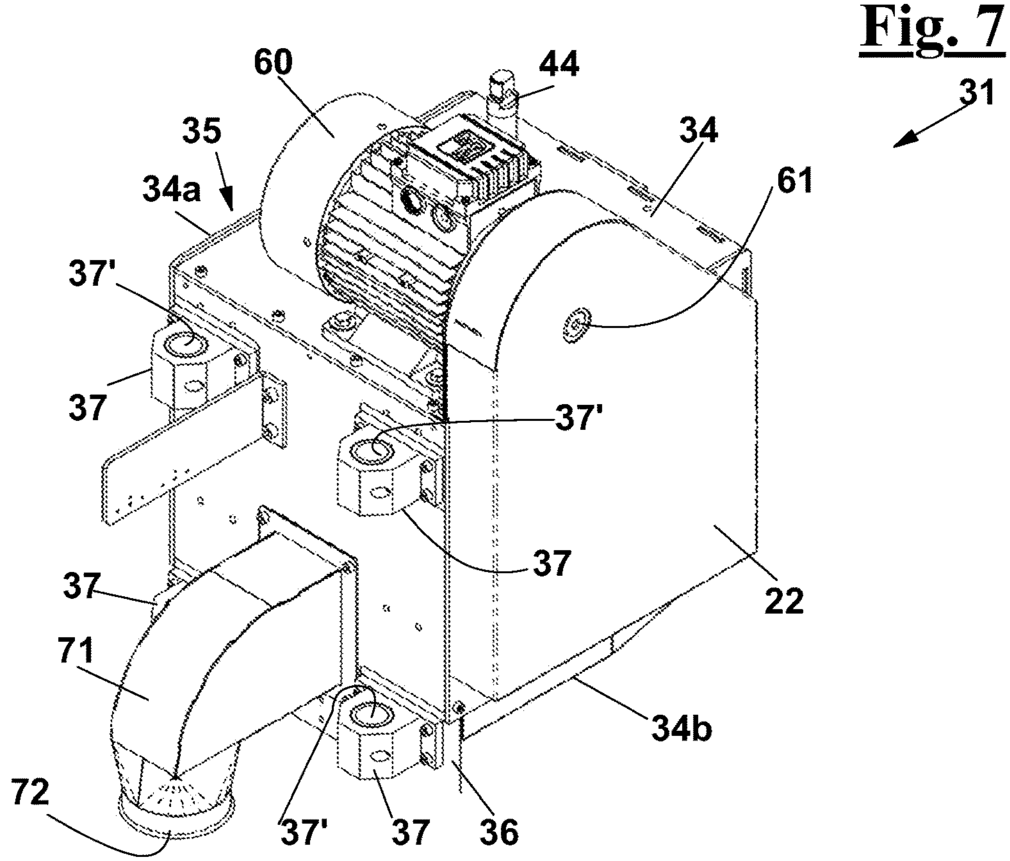

With reference to FIGS. 5 and 7, an apparatus according to an embodiment of the invention is described, in which a first linear guide member in the form of a pillar 3 extends from base frame 2 on the same side as cylinders 10 with respect to base frame 2, i.e., upwards, and movable support 35 comprises at least one sliding housing 37 having a through vertical engagement hole 37' to be slidably mounted along pillar 3. Thus, movable support 35 can translate vertically with respect to base frame 2. Preferably, as shown in FIG. 5, movable support 35 comprises two identical, vertically aligned sliding housings 37. The connection means of movable support 35 to base frame 2 is shown in FIG. 7 as well, where movable support 35 is equipped with two pairs of sliding housings 37 aligned with each other, so that sliding housings 37 of each couple engage with respective longitudinal guide members or pillars 3 extending vertically from base frame 2. For instance, linear guide member 3 and engagement hole 37' of sliding housing 37 can have a prismatic shape or a cylindrical shape, as shown still in FIG. 7.

FIG. 5 relates to a modification of the embodiment described just now, in which movable support 35 comprises at least one second linear guide member 38, and arm 42 comprises at least one housing 47 slidably mounted along second linear guide member 38 of movable support 35. Therefore, in this modification, also arm 42 is arranged to slide vertically, with respect to movable support 35. In this case, force member 44 can be an elongated force member. Such an elongated force member 44 can be one of the types indicated below, with a first end portion 44' fixed to movable support 35 and a second end portion 44", in particular opposite to first end portion 44', fixed to arm 42.

Figure 8:
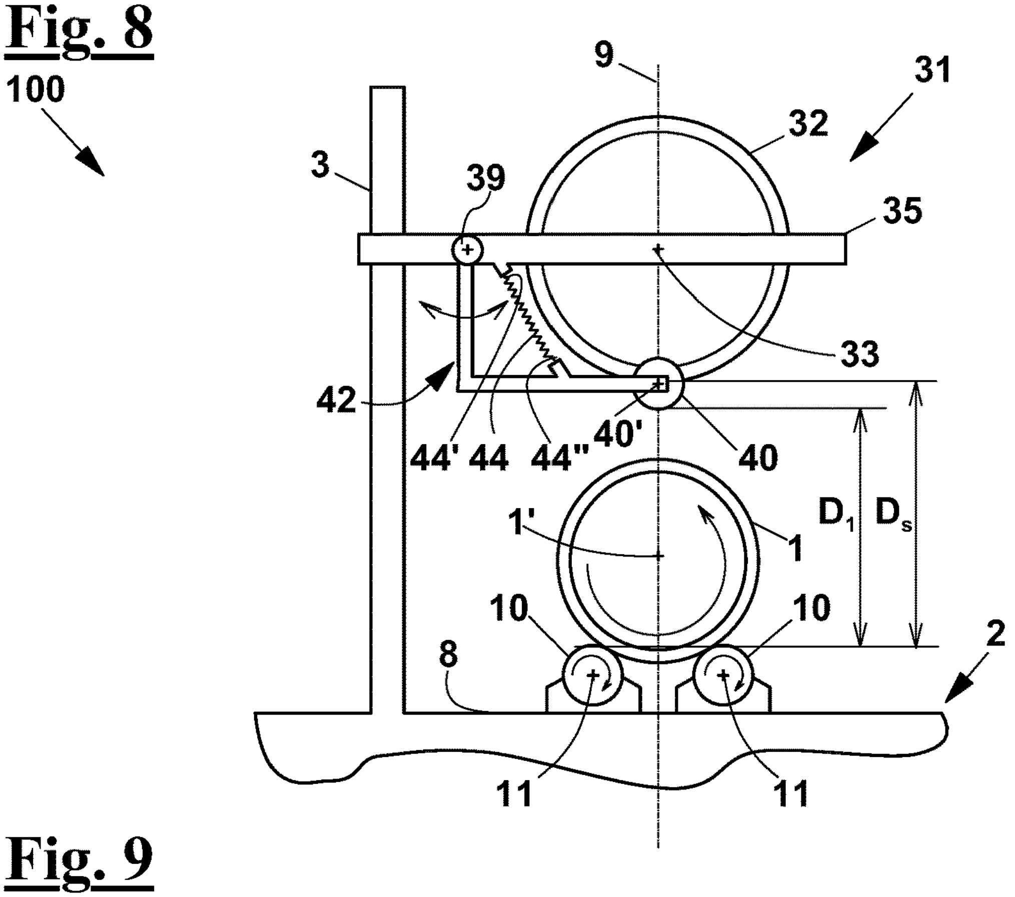
FIG. 8 diagrammatically shows a cutting head of an apparatus according to another embodiment of the invention, in which the circular blade is rotatably connected to the movable support.
Figure 9:
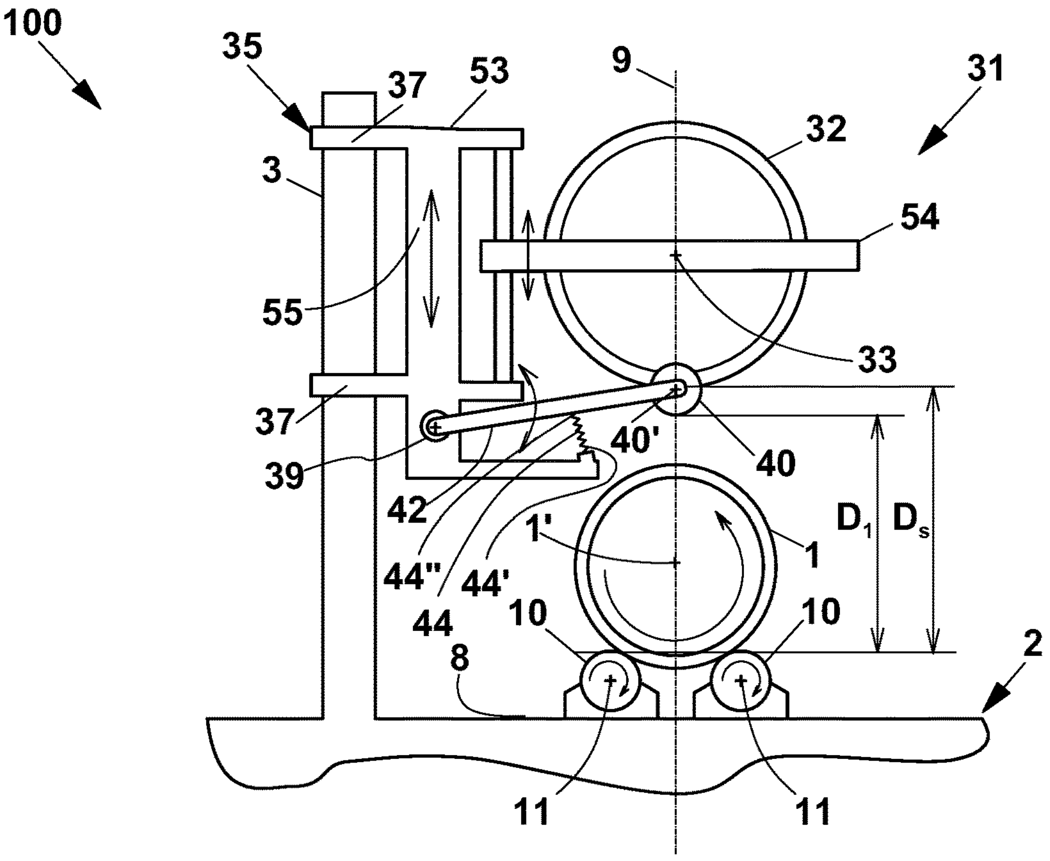
FIGS. 9 and 10 diagrammatically show equipment cutting heads according to further embodiments of the invention, in which the circular blade can be moved with respect to the movable support.
Figure 10:
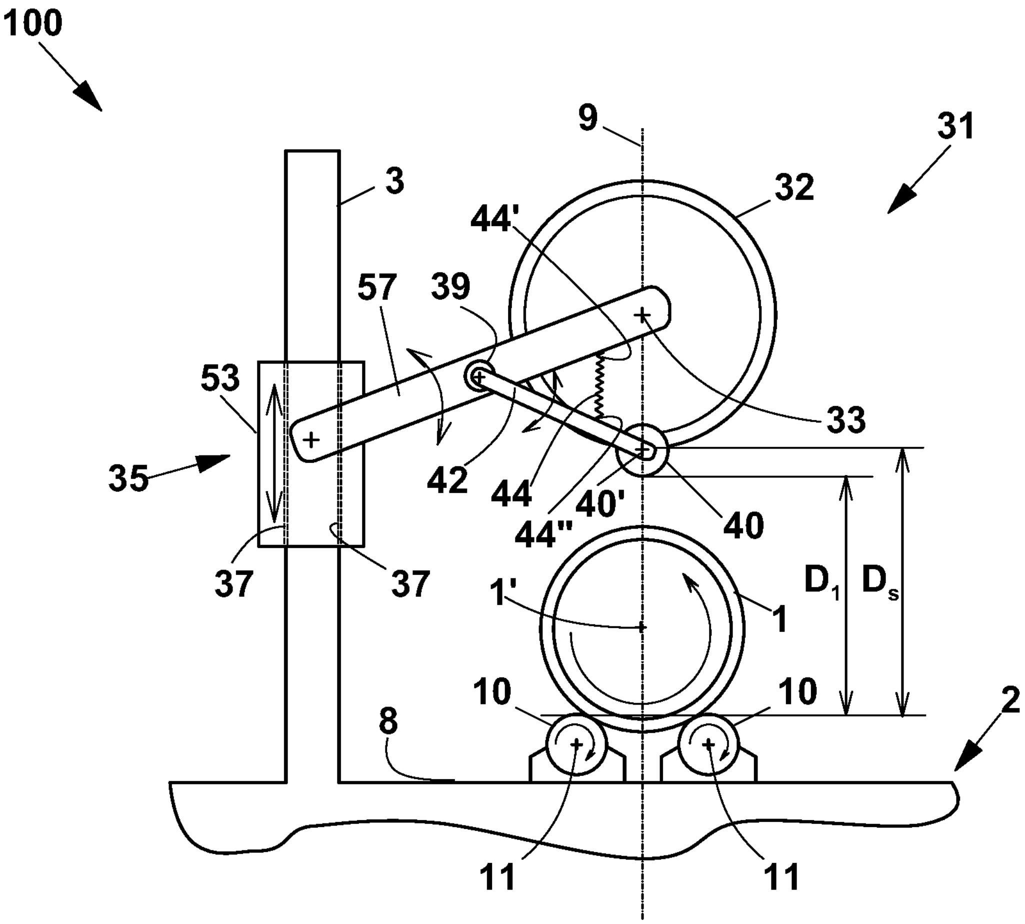

In further modifications, as shown in FIGS. 8-10, arm 42 is rotatably mounted, instead of rotatably, to movable support 35 by means of a hinge 39. Even in this case, as shown, force member 44 can be an elongated force member with end portions 44' and 44" fixed to movable support 35 and arm 42 respectively, the reverse being of course also possible.

Elongated force member 44 of the embodiments described above, as shown in FIGS. 2A-2I and 8-10, can be an elongated elastic force member, for example a compression spring 44 having a predetermined rate.

In further modifications, not shown, elastic force member 44 can consist of or include a torsion spring integrated in hinge 39. In this case, the torsion spring of hinge 39 can either be a common elastic torsion spring or a constant-torque torsion spring of a type known to the skilled person.

In some instances, the compression or torsion spring can be prestressed before mounting. A control of the elastic force applied by a compression spring or by a torsion spring between movable support 35 and arm 42 can be performed by appropriately varying the pre-compression.

As an alternative, the elastic force can be controlled by using a spring made of a shape memory alloy, selected for instance among some Ni—Ti alloys and some copper alloys, the crystallographic shape of which can be thermally predetermined, in particular, selected among an austenitic and a martensitic structure as known to the skilled person.

As an alternative, as shown in FIGS. 5-7 and 11, elongated force member 44 can be a pneumatic unit comprising a piston 45 and a cylinder 46 mutually sliding into each other, i.e., a cylinder-piston assembly, and providing respective first and second end portions 44',44" of elongated force member 44. An inner chamber, not shown, containing an amount of a gas is formed between piston 45 and cylinder 46.

In particular, the inner chamber of cylinder-piston assembly 44 can contain a predetermined and constant amount of gas, thereby forming an elastic force member. As a matter of fact, the force applied by cylinder-piston assembly 44 between movable support 35 and arm 42 is proportional to the gas pressure within the inner chamber and, therefore, to the relative position of piston 45 and cylinder 46, i.e., to the elongation of cylinder-piston assembly 44. In this case, the adjustment of this elastic force can be performed easily, by suitably selecting the amount of gas contained in the chamber, in order to univocally predeterminate the pressure of the gas within the chamber for any relative position of piston 45 and cylinder 46.

As an alternative, the inner chamber of cylinder-piston assembly 44 can be connected to a gas outlet device, not shown, including a relief valve configured to maintain a constant upstream gas pressure in the inner chamber of cylinder-piston assembly 44. This way, cylinder-piston assembly 44 is a constant-force member, i.e., it can apply a constant force between movable support 35 and arm 42, regardless of the elongation thereof. This force is proportional to the gas pressure within the inner chamber and, ultimately, to the pressure set of the relief valve. In this case, the force can be adjusted by modifying the pressure set of the relief valve, which is of adequate precision.

In a further embodiment, as shown in FIG. 9, movable support 35 comprises a main support portion 53 including sliding housing 37 engaging with linear guide member 3, and a further sliding support portion 54 mounted to a further linear guide member 55 integral to main support portion 53. Circular blade 32 is rotatably mounted with rotation axis 33 integral to sliding support portion 54. Arm 42, as anticipated, is rotatably mounted to movable support 35, in this case to main support portion 53 thereof, through hinge 39. In FIG. 9, force member 44 is represented as an elongated elastic force member, such as a compression spring. Nevertheless, even in this embodiment, force member 44 can include an elastic or constant-force cylinder-piston assembly, as described above, or can comprise a torsion spring integrated in hinge 39. In this embodiment, an actuator is also provided, not shown, configured to move sliding support portion 54 along with circular blade 32 with respect to main support portion 53.

In a further embodiment, as shown in FIG. 10, movable support 35 comprises a main support portion 53 including sliding housing 37 engaging with linear guide member 3, and a rotatable support portion 57 hinged to main support portion 53. Circular blade 32 is rotatably mounted with rotation axis 33 integral to rotatable support portion 57. Arm 42, as anticipated, is rotatably mounted to movable support 35, in this case to rotatable support portion 57 of movable support 35, through hinge 39. In FIG. 10, force member 44 is represented as an elongated elastic force member, such as a compression spring. Nevertheless, even in this embodiment, force member 44 can include an elastic or constant-force cylinder-piston assembly, as described above, or can comprise a torsion spring integrated in hinge 39. In this embodiment, an actuator is also provided, not shown, configured to move rotatable support portion 57 along with circular blade 32, with respect to main support portion 53.

In a further embodiment, not shown, movable support 35 is hinged to a vertical extension 3 of base frame 2. In this case, arm 42 is also advantageously rotatably mounted to movable support 35 by means of a hinge. Even in this embodiment, force member 44 may still be an elongated force member of the type described with reference to FIG. 8, or it can be an elastic force member made with a torsion spring integrated in hinge 39.

Figure 11:
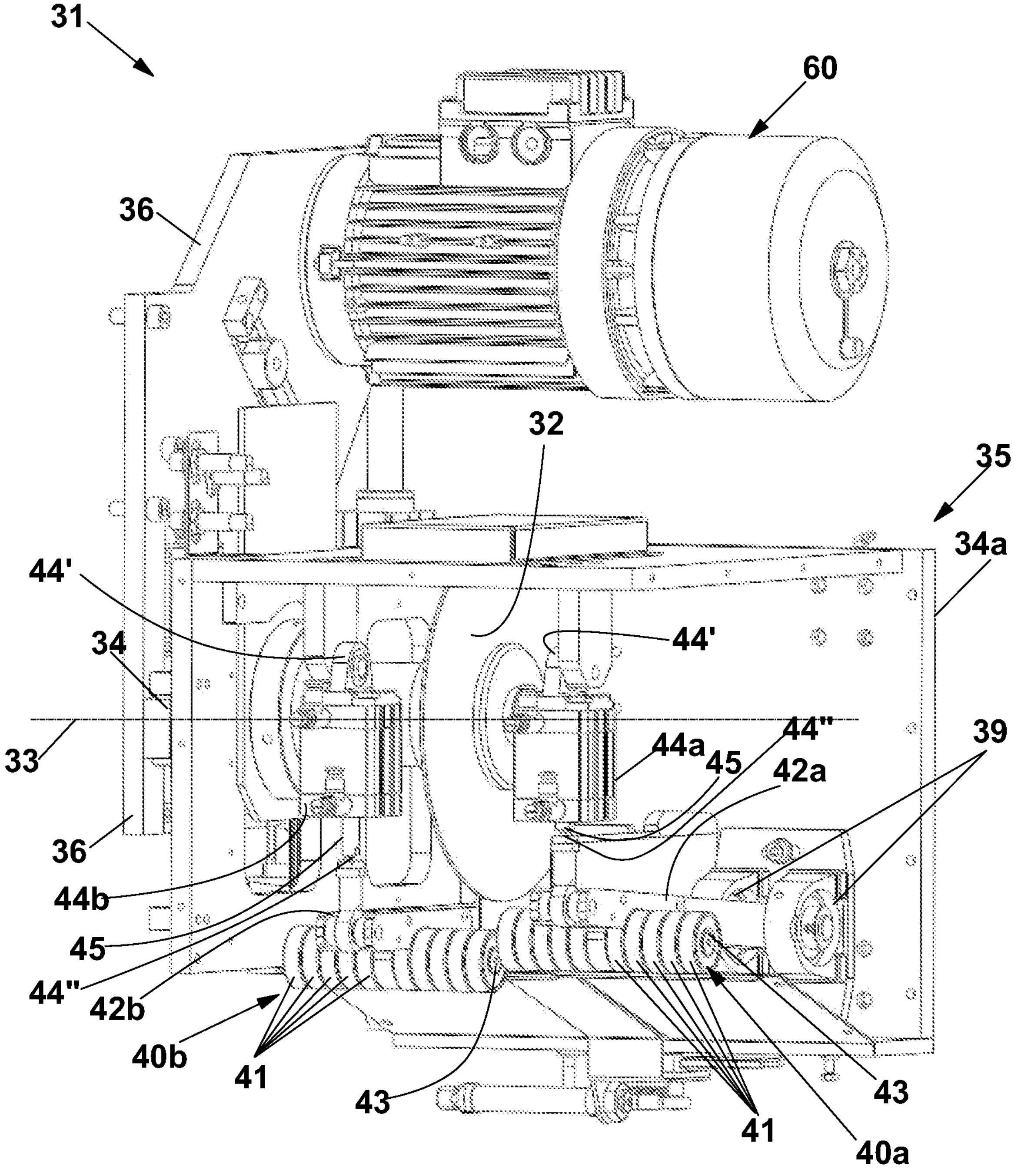
FIG. 11 is a diagrammatical perspective view of a cutting head of a piece of equipment according to a modification of the design in FIG. 5.

In a further advantageous embodiment, as shown in FIG. 11, two force members **44*a,b* are provided which movably connect respective arms 42*a,b* with movable support 35 in order to actuate two accompanying rollers 40*a,b* arranged upstream and downstream of circular blade 32, along forward conveying direction 5 of tubular body 1 (FIG. 1). Force members 44*a,b* are configured to apply different forces between respective arms 42*a,b* and movable support 35. In particular, force member 44*b* connected to arm 42*b* of accompanying roller 40*b* downstream of circular blade 32, in forward conveying direction 5 of tubular body 1, is configured to apply a force higher than the force applied by force member 44*a* connected to arm 42*a* of accompanying roller 40*a* upstream of circular blade 32**.

In a preferable modification of the above amendment, each accompanying roller **40*a*, 40*b* comprises a plurality of identical wheels 41 mounted to a same shaft 43*a*, 43*b* supported in a preferably central position by respective arms 42*a*, 42*b*. Wheels 41** are arranged beside one another and spaced apart from one another by a predetermined pitch.

In particular, in the case of force members made as elastic force members, the compliance of elastic force member **44*b* of downstream arm 42*b* is higher than the compliance of elastic force member 44*a* of upstream arm 42*a*. In FIG. 11, arms 42*a,b* and rollers 40*a,b* are shown in different angular positions for the sake of clarity, however, in use, they have obviously the same angular position corresponding to the dimensions of tubular body 1** being transversally cut.

On the other hand, in the case of force members **44*a,b* made as constant-force members, constant-force member 44*b* of downstream arm 42*b* is arranged to apply a force higher than constant-force member 44*a* of upstream arm 42. For example, in the case of constant-force members 44*a,b* made as cylinder-piston assemblies, the difference between the downstream and upstream forces is obtained by setting the relief valves of the internal chambers of the cylinder-piston assemblies 44*a,b*** to different pressure values, as anticipated.

Figure 6:
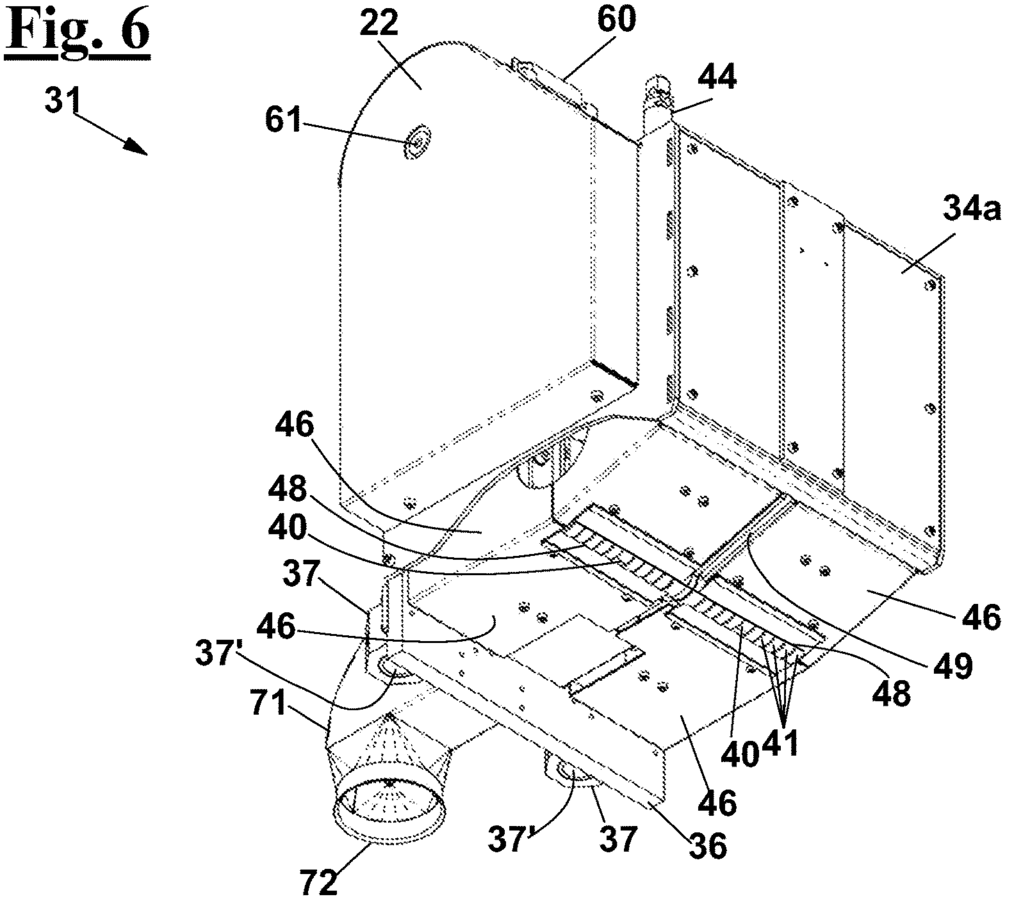
FIGS. 6 and 7 are diagrammatical perspective views of the cutting head of FIG. 5.

As shown in FIGS. 5 to 7, in some embodiments, movable support 35 comprises a first box portion **34*a* and a second box portion 34*b* that is arranged in such a way to slidingly engage within a lower portion of first box portion 35 due to the displacement of arm 42 with respect to movable support 35. This way, a protection casing is provided comprising first and second box portions 34*a* and 34*b* as upper and lower casing portions, respectively. As shown in FIG. 6, lower box portion 34*b* has an opening 48 through which predetermined segments of upstream and downstream rollers 40 protrudes or, in this case, through which predetermined segments of respective wheels 41 protrudes. Lower box portion 34*b* also has a slit 49 configured to allow a predetermined segment of circular blade 32 to protrude from protection casing 34*a-b* during the step of approaching circular blade 32 to tubular body 1 and the step of cutting tubular body 1 until lowered position B is attained (FIGS. 2C-2**F).

In order to remove any sawdust that can be generated, in particular, within protection casing **34*a-b* of FIGS. during the transversally cutting of tubular body 1, is advantageously connected to a suction unit via a suction duct 71 provided with a suction port 72. As shown in FIGS. 3 and 4, suction unit 65 is advantageously provided within base frame 2 and includes a fan 66 and a motor 67 to actuate the same, as well as a suction mouth 68 pneumatically connected to suction duct 71**.

Figure 12:
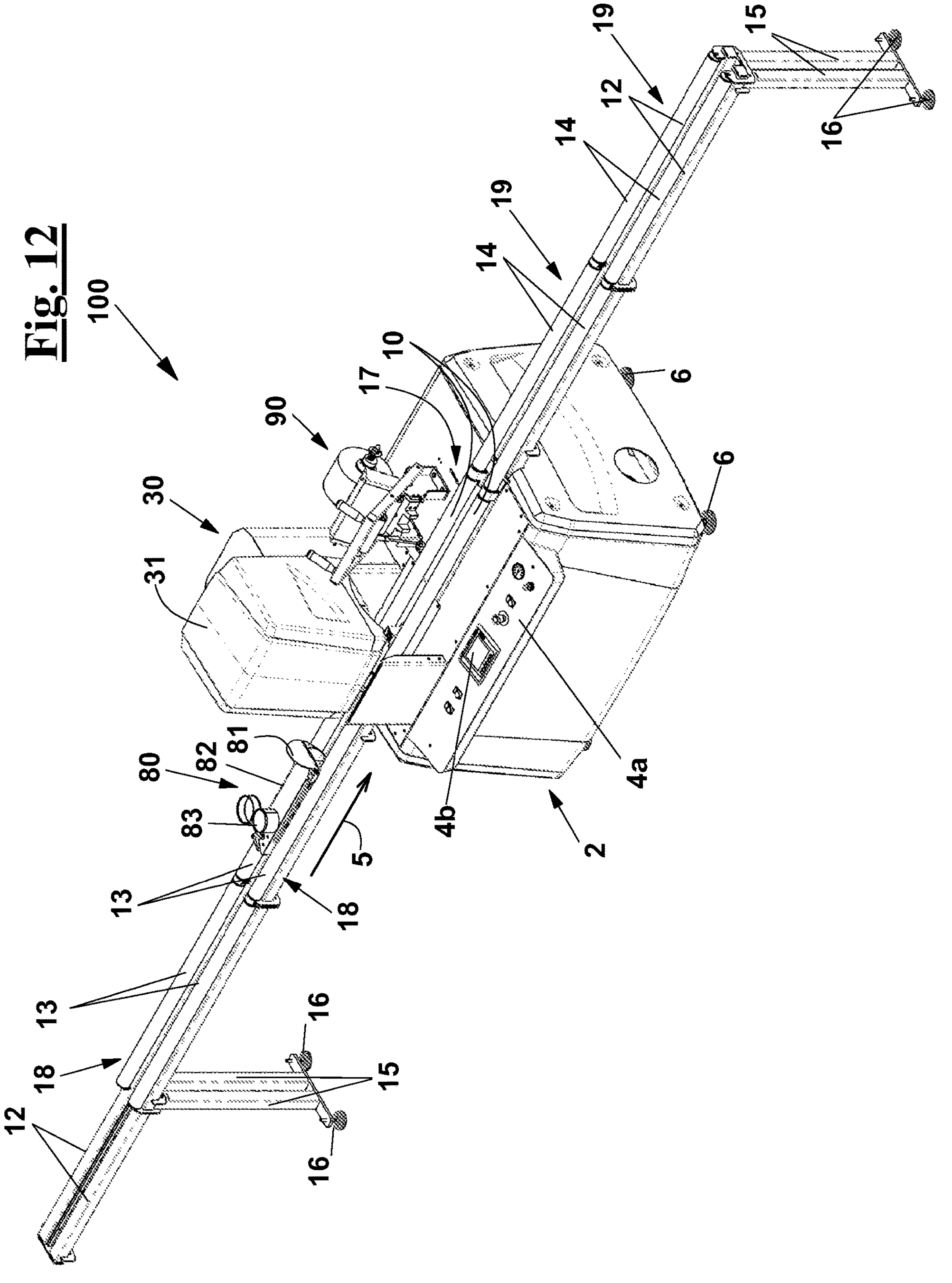
FIG. 12 is a diagrammatical perspective view of an apparatus for transversally cutting and butt joining tubular bodies, i.e., of an apparatus including a tubular body connection station, according to an embodiment of the invention.

With reference to FIG. 12, in one embodiment, apparatus 100 further includes a connection station 90 for forming a butt connection between tubular elements. Connection station 90 is preferably provided beside cutting station 30 along cradle 17, so as to assist forming the butt connection between tubular cut pieces obtained by transversally cutting one or more tubular bodies 1 at cutting station 30, as descried above, without removing the cut pieces to be joined from cradles 17, 18 and 19.

The positioning of tubular bodies 1 on cradle 17 can be carried out manually or automatically. In particular, apparatuses 100 shown in FIGS. 1 and 12 are configured for manual positioning of tubular bodies 1. To this purpose, a slide 80 is provided slidably arranged along cradles 17, 18 and 19 formed by motorised cylinders 10 and idle cylinders 13,14, respectively, in forward conveying direction 5 of the tubular bodies 1. Slide 80 has an abutment portion 81 facing cutting head 31 to support the tubular bodies to be cut. The length of the blank to be obtained by a cutting operation is set by arranging slide 80 with abutment portion 81 at a distance from circular blade 32 equal to said desired length. Optionally, as shown sill in FIGS. 1 and 12, slide 80 includes a container 82 provided with an opening 84 on the side of abutment portion 81 and an opening 83 arranged on the opposite side, available for connection with a suction unit such as suction unit 65 shown of FIGS. 3 and 4, to remove sawdust generated during the cutting operation.

Figure 13:
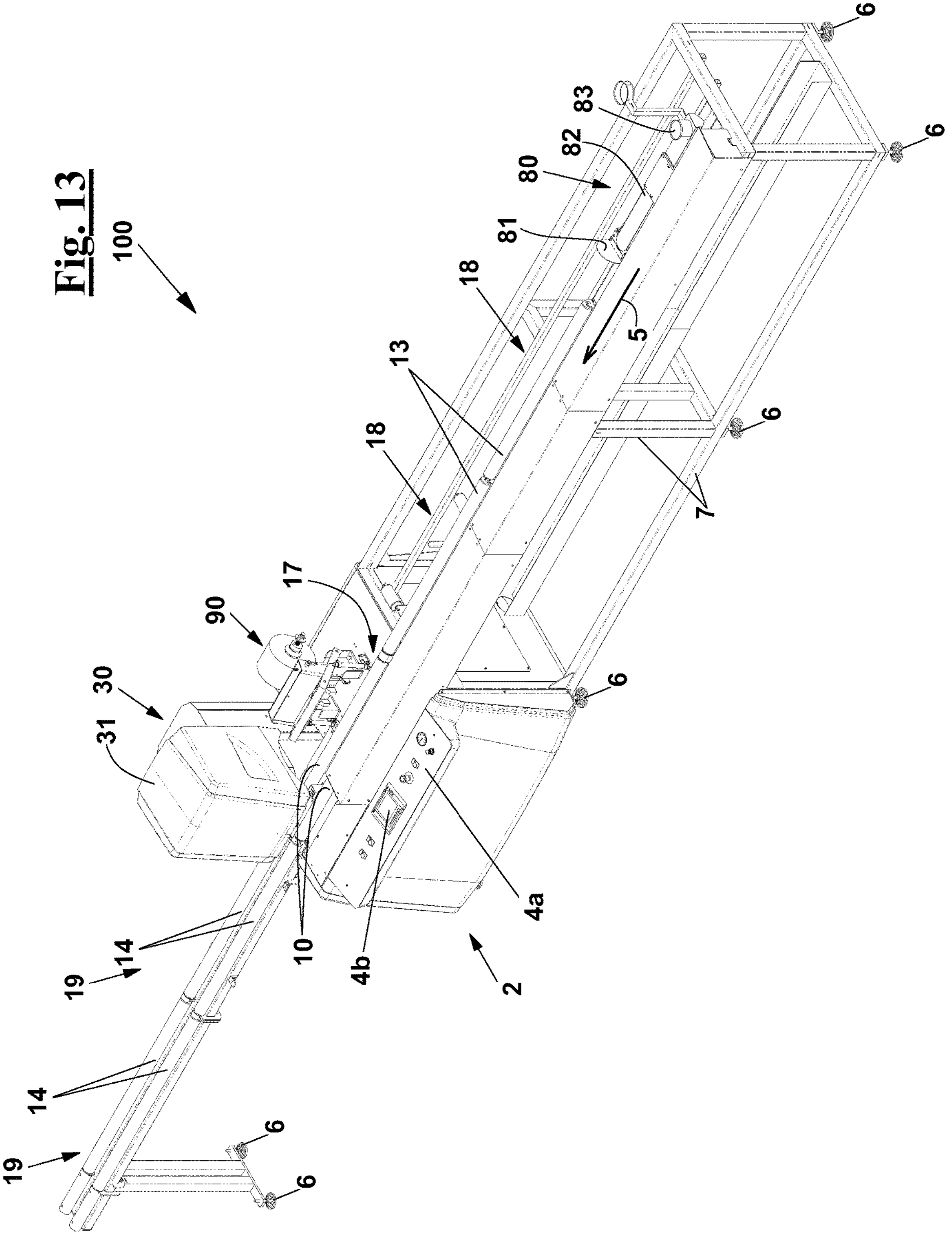
FIG. 13 is a diagrammatical perspective view of an apparatus for transversally cutting and butt joining tubular bodies, according to another embodiment of the invention, in which the tubular bodies can be positioned automatically in the cutting position.

In one embodiment shown in FIG. 13, configured for automatic positioning of tubular bodies 1 to be cut, a motorised slide 80 can be provided slidably arranged along cradles 17, 18 and 19, in this case, upstream of cutting head 31. Slide 80 is configured as a pusher device for pushing tubular bodies 1. To this purpose, slide 80 comprises an abutment portion 81 as in the case of FIGS. 1 and 12, and openings 83 for sawdust suction and connection to suction unit 65 may also be provided. In this case, an actuator means, not shown, is provided to move slide 80 along cradles 17, 18 and 19 and to position it with abutment portion 81 at a predetermined distance from circular blade 32 of cutting head 31, this distance corresponding to a desired length of the cut piece to be obtained by the cut operation. A program means of a control unit of apparatus 100, not shown but preferably housed within base frame 2 of apparatus 100.

The foregoing description of specific exemplary embodiments will so fully reveal the invention according to the conceptual point of view, such that others, by applying current knowledge, will be able to modify and/or adapt in various applications this specific exemplary embodiments without further research and without parting from the invention, and, then it is meant that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

The invention claimed is:

1. An apparatus for transversally cutting a tubular body having a predetermined thickness, said apparatus comprising:

a base frame;

a couple of cylinders horizontally arranged parallel to each other at a predetermined distance, and configured to turn in a same direction about respective longitudinal axes integral to said base frame;

an actuation means for rotatably actuating said tubular body; and a cutting head including:

a movable support arranged to perform a displacement towards and away from said couple of cylinders;

a circular blade rotatably mounted to said movable support about an own rotation axis, and arranged with an own cutting plane transversal to said cylinders, so that, by causing said circular blade to rotate during said displacement of said movable support towards said cylinders, said circular blade transversally cuts said thickness (t) of said tubular body arranged and rotatably moved on said cylinders; and an accompanying roller rotatably mounted to an arm and arranged to maintain said tubular body in contact with said cylinders during a rotation of said tubular body on said cylinders, wherein:

said actuation means of said tubular body comprises a motor arranged to cause said cylinders to rotate about said respective longitudinal axes, said movable support is arranged to perform said displacement, along with said circular blade, on an opposite side of said support with respect to said cylinders, said accompanying roller is rotatably idle and arranged on the same side as said cylinders with respect to said rotation axis of said circular blade, and said arm:

is movably connected to said movable support through a force member selected between an elastic force member and a constant-force member, and is arranged to move from a first raised position (A) to a lowered position (B) with respect to said movable support, in said raised position (A), said force member is in a rest configuration, and a distance (D1) of said accompanying roller from said cylinders is shorter than a distance (DS) of said circular blade from said cylinders, and instead, in said lowered position (B), said force member is in a working configuration, and said distance (D2) of said accompanying roller from said cylinders is longer than said distance ($D_S$) of said circular blade from said cylinders by a predetermined amount d which is at least equal to said thickness (t), that is, the relationship applies:

$$t \leq d = D_2 - D_s.$$

2. The apparatus according to claim 1, wherein at least one linear guide member extends from said base frame on the same side as said cylinders with respect to said base frame, and said movable support comprises at least one housing that is slidably mounted along said linear guide member.

3. The apparatus according to claim 2, wherein:

said first linear guide member is a first linear guide member, said movable support includes at least a second linear guide member, said arm comprises at least one housing slidably mounted along said second linear guide member, and said force member is an elongated force member having a first end portion fixed to said movable support and a second end portion fixed to said arm.

4. The apparatus according to claim 2, wherein:

said arm is rotatably mounted to said movable support by means of a hinge, said force member is selected from the group consisting of:

an elongated force member having a first end portion fixed to said movable support and a second end portion fixed to said arm; and a torsion spring integrated in said hinge.

5. The apparatus according to claim 3, wherein:

said elongated force member is selected from the group consisting of:

a compression spring; and a pneumatic unit comprising a piston and a cylinder providing respective end portions of said elongated force member, each selected between said first end portion and said second end portion, and a chamber is formed between said piston and said cylinder, said chamber containing an amount of a gas.

6. The apparatus according to claim 2, wherein:

said movable support comprises:

a main support portion comprising said housing for engagement with said linear guide member, and an articulated support portion movably connected to the main support portion, and said circular blade is rotatably mounted with said rotation axis integral to said articulated support portion.

7. The apparatus according to claim 6, wherein said articulated support portion is slidably mounted to a further linear guide member of said main support portion.

8. The apparatus according to claim 6, wherein said articulated support portion is hinged to said main support portion.

9. The apparatus according to claim 1, wherein said movable support is hinged to an extension of said base frame.

10. The apparatus according to claim 1, wherein:

said cutting head comprises two accompanying rollers and two respective arms as said accompanying roller and said arm, and said accompanying rollers and said respective arms are mounted on opposite sides with respect to said circular blade.

11. The apparatus according to claim 10, wherein:

said two arms are movably connected to said movable support through two respective force members, and a downstream force member movably connecting said movable support with a downstream arm of said accompanying roller arranged downstream of said circular blade, in a forward conveying direction of said tubular body towards said cutting head, is configured to apply a force between said movable support and said downstream arm that is higher than a force applied by an upstream force member movably connecting said movable support with an upstream arm of said accompanying roller that is arranged upstream of said circular blade, in said forward conveying direction.

12. The apparatus according to claim 1, wherein said or each accompanying roller comprises a plurality of equal wheels mounted to a same shaft or to a respective shaft and arranged beside one another and spaced apart from one another.

13. The apparatus according to claim 1, wherein;

said movable support comprises a first portion, and a second portion is arranged integral to said arm, said second portion having an opening through which a predetermined segment of said roller protrudes, and providing a slit configured to allow a predetermined segment of said circular blade to protrude when said arm is in said second position (B), said first and second portions mutually arranged in such a way to form, during said displacement of said movable support, a box-shaped protection casing.

14. The apparatus according to claim 1, further including a connection station for forming a butt connection between tubular bodies.

* * * * *